United States Patent
Kong

(10) Patent No.: US 9,464,243 B2
(45) Date of Patent: Oct. 11, 2016

(54) DEVICE FOR PREPARING THE FUEL GAS USED FOR POWER GENERATION AND A METHOD FOR PREPARATION OF FUEL GAS

(71) Applicant: Lingzeng Kong, Jinan (CN)

(72) Inventor: Lingzeng Kong, Jinan (CN)

(*) Notice: Subject to any disclaimer, the term of this patent is extended or adjusted under 35 U.S.C. 154(b) by 93 days.

(21) Appl. No.: 14/552,910

(22) Filed: Nov. 25, 2014

(65) Prior Publication Data

US 2015/0143749 A1  May 28, 2015

(30) Foreign Application Priority Data

Nov. 27, 2013 (CN) .......................... 2013 1 0609929
Oct. 24, 2014 (CN) .......................... 2014 1 0576730

(51) Int. Cl.
*C10J 3/42* (2006.01)
*C10J 3/06* (2006.01)

(52) U.S. Cl.
CPC .. *C10J 3/42* (2013.01); *C10J 3/06* (2013.01); *C10J 2300/093* (2013.01); *C10J 2300/0906* (2013.01); *C10J 2300/0916* (2013.01); *Y02E 20/16* (2013.01); *Y02E 50/10* (2013.01); *Y02E 50/30* (2013.01)

(58) Field of Classification Search
CPC ....... C10J 3/42; C10J 3/06; C10J 2300/0906
See application file for complete search history.

(56) References Cited

U.S. PATENT DOCUMENTS

| 5,296,005 | A | * | 3/1994 | Wolfe ...................... C10B 7/10 44/281 |
| 5,510,073 | A | * | 4/1996 | Kaegi ................ B29C 47/6068 264/102 |
| 2006/0243583 | A1 | * | 11/2006 | Sprouse ................... B01J 8/003 202/262 |
| 2010/0317748 | A1 | * | 12/2010 | Hassan ............... B01F 7/00766 518/700 |

* cited by examiner

*Primary Examiner* — Matthew Merkling
(74) *Attorney, Agent, or Firm* — Han IP Corporation

(57) ABSTRACT

The present disclosure provides methods and devices for preparing the fuel gas used. A device may include a furnace body, a tower type synchronous roller extruding machine with a circular ladder groove mold that is mounted at the upper end of the furnace body. The tower type synchronous roller extruding machine is provided with a bucket, the bucket is in airtight connection with the furnace body, and a first transmission shaft is mounted in the bucket. At least two tower type synchronous rollers are mounted on the first transmission shaft, and the tower type synchronous rollers are symmetrically distributed on both sides of the first transmission shaft.

6 Claims, 12 Drawing Sheets

41
Pulverized coal particles and oxygen
The Tai Zhong gas workshop laboratory
gas analysis report

| October 18,2013 | one meter furnace Boiler no. |
|---|---|
| The sample source | Fourteen forty |
| Analysis time | |
| Composition | Content % |
| Carbon dioxide | 29.2 |
| Hydrocarbon | |
| Oxygen | 0.8 |
| Carbon monoxide | 18.8 |
| Hydrogen | 41.8 |
| Methane | 10.0 |
| Nitrogen | 0.0 |
| Calorific value | 10481 KJ/m³ |
| Remark | |

Analyser:Jiping Wu

47
Pulverized coal particles and oxygen
The Tai Zhong gas workshop laboratory
gas analysis report

| October 18,2013 | one meter furnace Boiler no. |
|---|---|
| The sample source | Eighteen ten |
| Analysis time | |
| Composition | Content % |
| Carbon dioxide | 25.0 |
| Hydrocarbon | |
| Oxygen | 2.0 |
| Carbon monoxide | 19.4 |
| Hydrogen | 40.0 |
| Methane | 8.6 |
| Nitrogen | 0.0 |
| Calorific value | 9672 KJ/m³ |

Analyser:Jiping Wu

56
Pulverized coal particles and oxygen
The Tai Zhong gas workshop laboratory
gas analysis report

| October 19,2013 | one meter furnace Boiler no. |
|---|---|
| The sample source | Nineteen ten |
| Analysis time | |
| Composition | Content % |
| Carbon dioxide | 21.0 |
| Hydrocarbon | |
| Oxygen | 0.9 |
| Carbon monoxide | 24.6 |
| Hydrogen | 42.7 |
| Methane | 7.0 |
| Nitrogen | 0.0 |
| Calorific value | 10254 KJ/m³ |
| Remark | |

Analyser:Jiping Wu

Pulverized coal particles and oxygen
The Tai Zhong gas workshop laboratory
gas analysis report

| October 29,2013 | one meter furnace Boiler no. |
|---|---|
| The sample source | |
| Analysis time | Fourteen |
| Composition | Content % |
| Carbon dioxide | 18.8 |
| Hydrocarbon | |
| Oxygen | 1.2 |
| Carbon monoxide | 46.2 |
| Hydrogen | 27.2 |
| Methane | 10.2 |
| Nitrogen | 0.0 |
| Calorific value | 12465 KJ/m³ |
| Remark | |

Analyser:Jiping Wu

83

Pulverized coal particles and oxygen
The Tai Zhong gas workshop laboratory
gas analysis report

| October 29,2013 | one meter furnace Boiler no. |
|---|---|
| The sample source | |
| Analysis time | Fifteen |
| Composition | Content % |
| Carbon dioxide | 19.4 |
| Hydrocarbon | |
| Oxygen | 0.4 |
| Carbon monoxide | 43.4 |
| Hydrogen | 29.2 |
| Methane | 10.4 |
| Nitrogen | 0.0 |
| Calorific value | 12415 KJ/m³ |
| Remark | |

Analyser:Jiping Wu

84

Pulverized coal particles and oxygen
The Tai Zhong gas workshop laboratory
gas analysis report

| October 29,2013 | one meter furnace Boiler no. |
|---|---|
| The sample source | |
| Analysis time | Sixteen |
| Composition | Content % |
| Carbon dioxide | 15.4 |
| Hydrocarbon | |
| Oxygen | 0.4 |
| Carbon monoxide | 47.2 |
| Hydrogen | 28.1 |
| Methane | 9.6 |
| Nitrogen | 0.0 |
| Calorific value | 12405 KJ/m³ |
| Remark | |

Analyser:Jiping Wu

FIG. 12

DEVICE FOR PREPARING THE FUEL GAS USED FOR POWER GENERATION AND A METHOD FOR PREPARATION OF FUEL GAS

CROSS REFERENCE TO RELATED PATENT APPLICATIONS

This application claims priority to Chinese Patent Application No. 201410576730.6, filed on Oct. 24, 2014, entitled "a device for preparing the fuel gas used for power generation and a method for preparation of fuel gas," which claims priority to Chinese Patent Application No. 201310609929.X, filed on Nov. 27, 2013, entitled "multiple grooves stepwise synchronous wheel machine and its preparation method," which is hereby incorporated by reference in its entirety.

TECHNICAL FIELD

The present disclosure relates to devices for preparing the fuel gas used for power generation and methods for preparation of fuel gas.

BACKGROUND

The fuel gas for gas turbine power generation is required to have such technical indicators as higher heat value and higher purity; otherwise the gas turbine is unable to perform continuous normal operation. To reach the technical indicators, fuel materials for preparation of fuel gas are fine lump coal, coke or high-grade coal dust, coal water slurry or fuel oil suitable for spraying. However, resources of these raw materials are limited and the cost for preparation of fuel gas is high. Since it is difficult to maintain the normal operation of gas turbine, the coal-based gas turbine power generation has not been improved. In order to reduce the cost of gas turbine power generation, methods related to pressurized water coal gas, dry-fired coal gas and sprayed pure special-purpose gas generating coal dust for the gas turbine are being adopted. However, these methods still have problem, for example, to reduce the power-production cost of gas turbine.

SUMMARY

It is the technical objective of the present disclosure to provide a device for preparing the fuel gas used for power generation as well as a method for preparation of fuel gas, so as to overcome the deficiency of the prior art.

The above-mentioned objective of the present disclosure is achieved through the following technical solution: a device for preparing fuel gas used for power generation, the device comprising a furnace body, a tower type synchronous roller extruding machine with a circular ladder groove mold is mounted at the upper end of the furnace body, the tower type synchronous roller extruding machine is provided with a bucket, the bucket is in airtight connection with the furnace body, a first transmission shaft is mounted in the bucket, at least two tower type synchronous rollers are mounted on the first transmission shaft, and the tower type synchronous rollers are symmetrically distributed on both sides of the first transmission shaft; In the bucket, a circular ladder groove mold is mounted at the lower part of the tower type synchronous roller, an annular groove is provided at the circular ladder groove mold, a die hole is provided in the annular groove, a through hole is provided in the middle part of the circular ladder groove mold, the upper end of the bucket is set as the feed inlet, the lower end of the bucket is used as the opening, the opening is located in the gas producer furnace, a grate is installed at the lower part of the gas producer furnace body, and the grate is connected with the second transmission shaft, a slagging pipe is mounted one side at the bottom end of furnace body, an air inlet hole is provided in the second transmission shaft, the air inlet hole is communicated with a gas-mixing pipe, the gas-mixing pipe is respectively connected with a vapor pipe and an air pipe, a power transmission part is mounted on the second transmission shaft, the power transmission part is connected with the motor, the slagging pipe is connected with a slagging tank, a spiral shaft is mounted in the spiral slagging pipe, a furnace bottom ring and a furnace bottom plate are provided at the bottom of the gas producer furnace body A secondary shaft sleeve is mounted in the middle of the furnace bottom plate, a second transmission shaft is mounted in the second shaft sleeve, a furnace bottom plate driving wheel is mounted at the bottom of the second transmission shaft, an ash separation pan is mounted at the middle-upper part of the second transmission shaft, an ash scraper pan is mounted at the second shaft sleeve, the grate is provided at the upper part of the ash scraper pan, the grate comprises multi-layer circular trays through connection up and down, and the diameters of the circular trays gradually increase from top to bottom. More than two annular grooves are provided on the upper surface of the circular ladder groove mold, the annular grooves are distributed in ladder form; the inner wall on the outer edge of the annular groove is an arc-like incline plane, die holes are provided in each of annular grooves, and the die holes are evenly distributed within the 360° range of annular grooves.

The tower type synchronous roller comprises multiple annular tower type rolling trays with their diameters distributed in ladder form, the diameters of the annual rolling trays gradually increase outwards from the central portion of the bucket, and each annual rolling tray is coordinated with the corresponding annular groove. Every two annual grooves are connected through an inclined plane, the high end of the inclined plane is located at the external edge of the annular groove with small diameter, and the low end of the inclined plane is located at the internal edge of the annular groove with large diameter, the external edge at the upper end of the annular groove with the minimum diameter is higher than the external edge at the upper end of any annular groove. The first annular rolling tray is mounted at the first shaft sleeve, the first shaft sleeve is mounted on a rolling machine bearing, the rolling machine bearing is mounted on one side of the supporting shaft, one end surface of the rolling machine bearing is closely fitted to mount a graphite packing, the external end surface of the graphite packing and the external end surface of the first shaft sleeve are located in a same vertical plane. Two edges at the internal bottom plane of the annular groove are designed as circular arc shape, the external edge at the end surface of the annual rolling tray is a fillet, the width L1 of the base plane of the annular groove is bigger than the end surface width L2 of the annual rolling tray by about 1-2 mm, the width of each annual groove is about 20-40 mm, the diameter of each die holes 7-30 mm, the height of each die hole is about 40-60 mm.

The method for using the device for preparing the fuel gas used for power generation to prepare fuel gas comprises the following steps:

Taking the mixture of crushed coal, coal or coal power and slag (sludge), the mixture of crushed coal and straw or the mixture of stack coal and straw as raw material so that its water content reaches about 10-35%;

Loading the raw material into the first machine set for repeated rolling and mixing, so as to prepare the raw material into mud body; through the die holes of the annular groove, squeezing out loose particles, the diameter of die hole is about 20-30 mm;

Loading the loose particles into the second machine set for repeated rolling and mixing, through the die holes of the annular groove, squeezing out the raw materials of cylindrical particles, the diameter of die hole is about 20-30 mm;

Loading the raw materials of cylindrical particles into the third machine set for repeated rolling and mixing, squeezing out cylindrical particles through the die holes of annual groove, the diameter of die hole is about 12-30 mm; the cylindrical particles directly enter the gas producer furnace body and generate fuel gas after combustion. The first machine set, the second machine set and the third machine set have the same structure, wherein the first machine set has the following structure: Comprising a furnace body, a tower type synchronous roller extruding machine with a circular ladder groove mold 1 is mounted at the upper end of the furnace body, the tower type synchronous roller extruding machine is provided with a bucket, the bucket is in airtight connection with the furnace body, a first transmission shaft is mounted in the bucket, at least two tower type synchronous rollers are mounted on the first transmission shaft, and the tower type synchronous rollers are symmetrically distributed on both sides of the first transmission shaft; In the bucket, a circular ladder groove mold is mounted at the lower part of the tower type synchronous roller, an annular groove is provided at the circular ladder groove mold, a die hole is provided in the annular groove, a through hole is provided in the middle part of the circular ladder groove mold, the upper end of the bucket is set as the feed inlet, the lower end of the bucket is used as the opening, the opening is located in the gas producer furnace, a grate is installed at the lower part of the gas producer furnace body, and the grate is connected with the second transmission shaft. A slagging pipe is mounted one side at the bottom end of furnace body, an air inlet hole is provided in the second transmission shaft, the air inlet hole is communicated with a gas-mixing pipe, the gas-mixing pipe is respectively connected with a vapor pipe and an air pipe, a power transmission part is mounted on the second transmission shaft, the power transmission part is connected with the motor, the slagging pipe is connected with a slagging tank, a spiral shaft is mounted in the spiral slagging pipe, a furnace bottom ring and a furnace bottom plate are provided at the bottom of the gas producer furnace body. A second shaft sleeve is mounted in the middle of the furnace bottom plate, a second transmission shaft is mounted in the second shaft sleeve, a furnace bottom plate driving wheel is mounted at the bottom of the second transmission shaft, an ash separation pan is mounted at the middle-upper part of the second transmission shaft, an ash scraper pan is mounted at the second shaft sleeve, the grate is provided at the upper part of the ash scraper pan, the grate comprises multi-layer circular trays through connection up and down, and the diameters of the circular trays gradually increase from top to bottom.

The raw materials include stack coal and slag, the proportion of which are calculated by weight: stack coal about 60-70% and slag about 10-20%, and the water content of the mixture of stack coal and slag is about 10-35%.

The first machine set may include: more than two annular grooves are provided on the upper surface of the circular ladder groove mold, the depths of the annual grooves are distributed in ladder form according to the diameter differences between the internal and the external extrusion trays; the inner wall on the outer edge of the annular groove is an arc-like incline plane, die holes are provided in each of annular groove, the die holes are evenly distributed within the 360° range of annular grooves; every two annual grooves are connected through an inclined plane, the high end of the inclined plane is located at the external edge of the annular groove with small diameter, and the low end of the inclined plane is located at the internal edge of the annular groove with large diameter, the external edge at the upper end of the annular groove with the minimum diameter is higher than the external edge at the upper end of any annular groove. The tower type synchronous roller comprises multiple annular tower type rolling trays with their diameters distributed in ladder form, the diameters of the annual rolling trays gradually increase outwards from the central portion of the bucket, and each annual rolling tray is coordinated with the corresponding annular groove.

The device for preparing the fuel gas used for power generation of the present disclosure is designed to directly load the cylindrical particle fuel into the tower type synchronous roller extruding machine. The tower type synchronous roller extruding machine is used for rolling the raw materials of fuel and squeeze them into die holes of the circular ladder groove mold to water-bearing fuel material in cylindrical particle shape. Therefore, the fuel materials substitute the lump coal and directly fall into the hearth of the device for preparing fuel gas for combustion and thus prepare the fuel gas. The main features of present disclosure include in that: it can use crushed coal or stack coal as main raw materials to prepare cylindrical particle fuel so that the dirt band and dirt in the crushed coal or stack coal are rolled into mutually packed powder mud. Therefore, the coal dust is not blocked by dirt band and dirt in furnace and gasification and smoothly release fuel gas from honeycomb channel. The present disclosure can improve the coal gasification efficiency of crushed coal or stack coal, perform preheating without burst and form cylindrical slag. Through the rolling, mixing and squeezing by the tower type synchronous roller extruding machine of the present disclosure, the generated cylindrical particle fuel can substitute lump coal and directly enter the hearth and directly combusted to prepare fuel gas so that the cylindrical particle fuel can substitute costly raw materials such as fine lump coal, fuel oil, coke and fine purified sprayed coal dust. In addition, the gasification and heat value of fuel can reach higher level, and the cost for preparation of fuel gas is greatly reduced. When the water content in the straw particles extruded by the tower type synchronous roller extruding machine have been evaporated, honeycomb slag can be formed. In addition, since the cylindrical particle materials contain water content, the function of smoothing space honeycomb can be left after catalytication and water evaporation, and the content of hydrogen and methane in the fuel gas can be increased. After evaporation of water and dry distillation, the particles prepared in the method of the present disclosure form honeycomb channel, which facilitate the preparation of pure oxygen gasification agent, and no nitrogen is included in the prepared fuel gas. Through detection: CO about 10%-30%, $H_2$ about 25%-40%, $CH_4$ about 9%-15%, $CO_2$ lower than about 15-30%, $O_2$ lower than about 0.8%, the heating value is about 9500-14000 KJ/m3, with high purity of fuel gas. In the meantime of the production of fuel gas, such by-products as tar, benzene, phenol and sculpture can be recovered. In the method for preparation of fuel gas of the present disclosure, the inlet steam is increased. In addition to absorbing the heat quantity released in the carbon monoxide reaction process and generating high temperature carbon, the steam and carbon can generate reductive decomposition reaction and release carbon monoxide and hydrogen, thus increasing the output of fuel gas. After the introduced oxygen and steam or air is mixed with the straw in the steam and fuel material or the coal dust honeycomb, they are decomposed to generate clean gas containing methane, ethane or methanol/alcohol, so that the tar extraction rate of coal can be increased when then output of fuel gas is also increased. The fuel gas prepared in the method of the present disclosure can be directly used to drive gas turbine or combined cycle generation of gas turbine and steam turbine, so that the power generation coal consumption is reduced by 45% as compared with coal-fired power generation. The device of the present disclosure is featured by low manufacturing cost and reasonable structure. Through rolling and mixing, the raw materials such as crushed coal and straw can be loaded in the final granulation machine and directly extruded into cylindrical particle fuel and continuously enter the fuel gas producer furnace. The tower type synchronous roller extruding machine can be in tight connection with the casing of fuel gas producer furnace, so that such problem is thoroughly solved: when the fuel gas producer furnace is required to operate under high pressure, the pressure in furnace can be easily reduced in the transmission of fuel. The present disclosure can realize the continuous loading of fuel material required by the fuel gas producer furnace at uniform speed, and can keep constant temperature and pressure in the furnace (the pressure in the fuel gas producer furnace is about 0.7-30 kg/cm$^2$). As the result, as the fuel material for power generation, the coal fuel gas can be stably input into gas turbine. The fuel gas produced in the method for preparation of fuel gas can always keep temperature of about 500° C.-1300° C. Under the action of high pressure and high temperature, the fuel gases in the furnace generated more methane, and the coal fuel gas output in normal pressure gas producer furnace can be directly used in gas turbine.

BRIEF DESCRIPTION OF THE DRAWINGS

The detailed description is described with reference to the accompanying figures.

FIG. 11 is the coal gas analysis report form of samples 41, 47 and 56.

FIG. 12 is the coal gas analysis report form of samples 82, 83 and 84.

DETAILED DESCRIPTION

Figure 1:
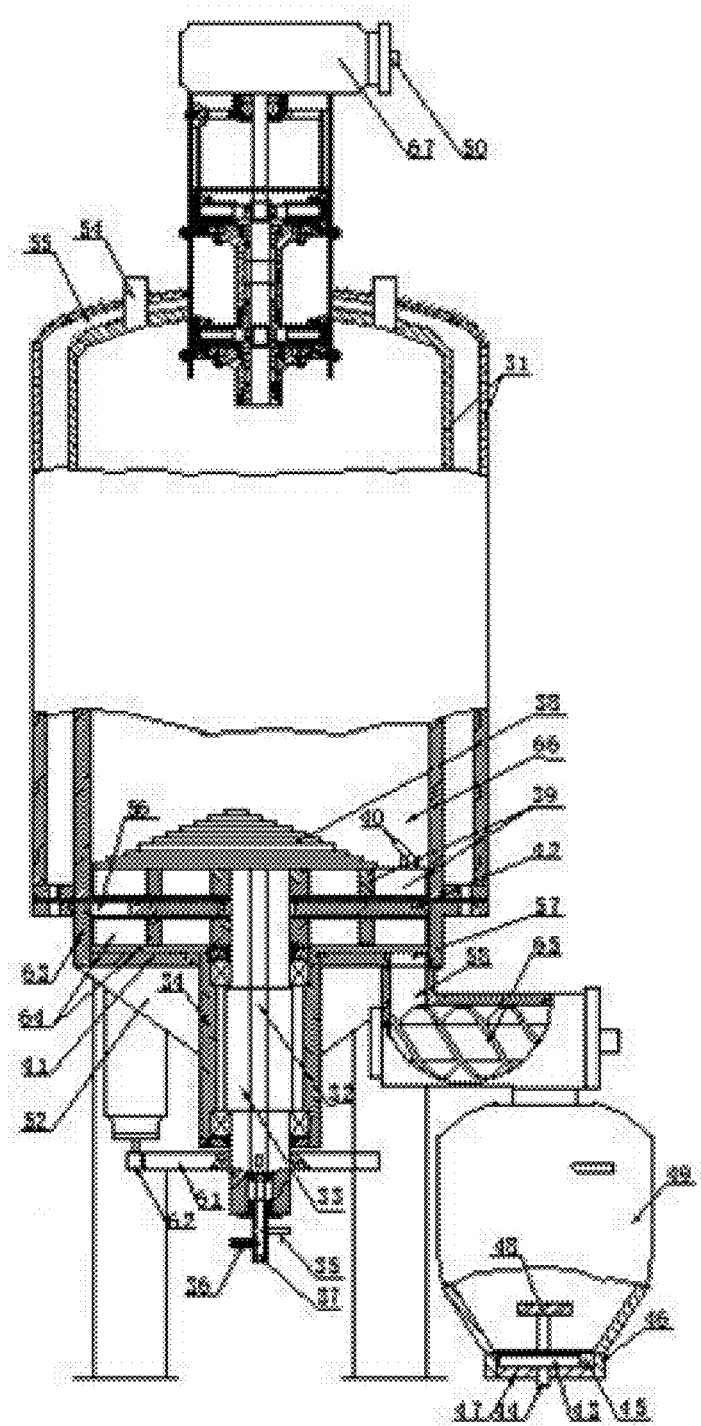
FIG. 1 is the structural representation of the present disclosure.
Figure 2:
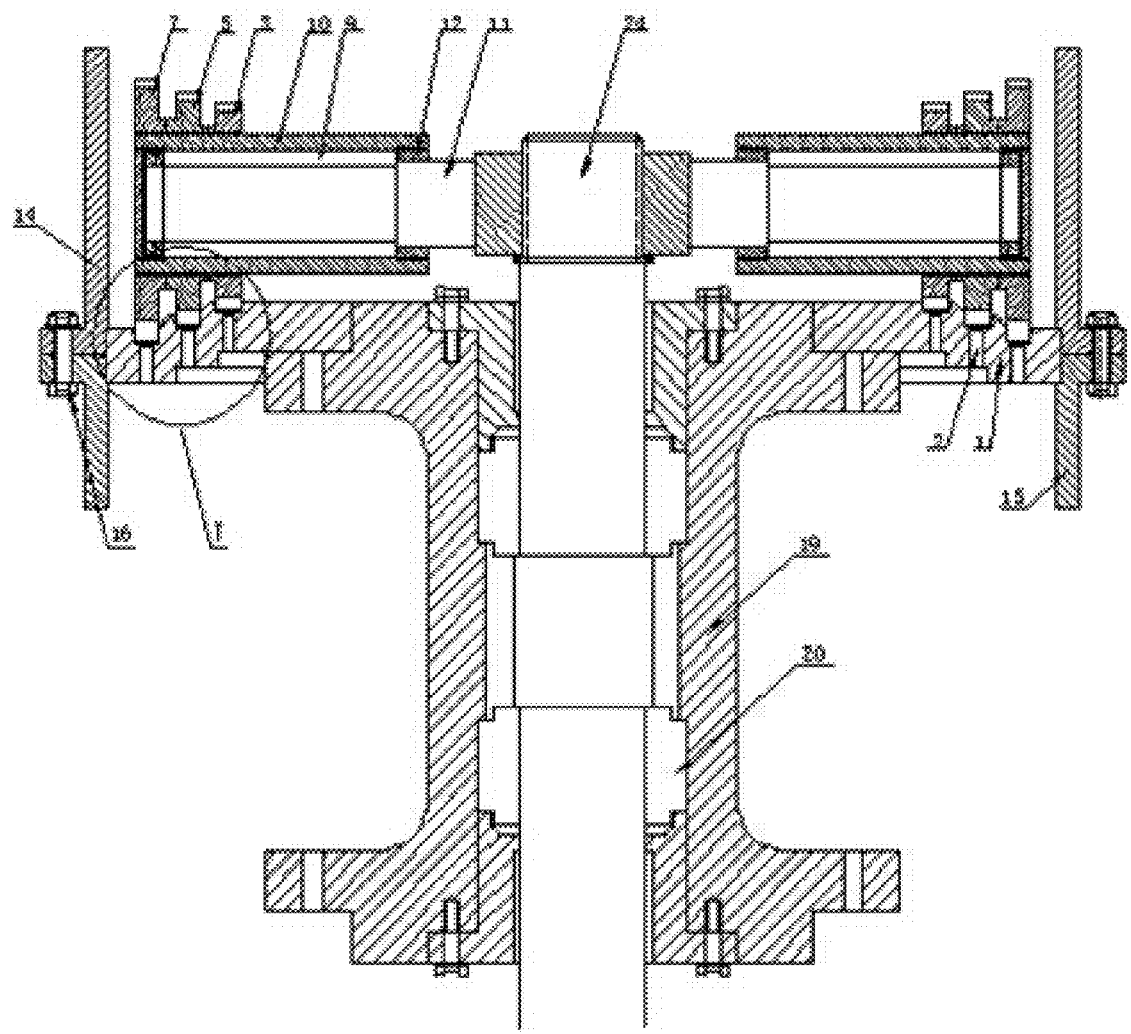
FIG. 2 is the structural representation of the tower type synchronous roller extruding machine.
Figure 3:
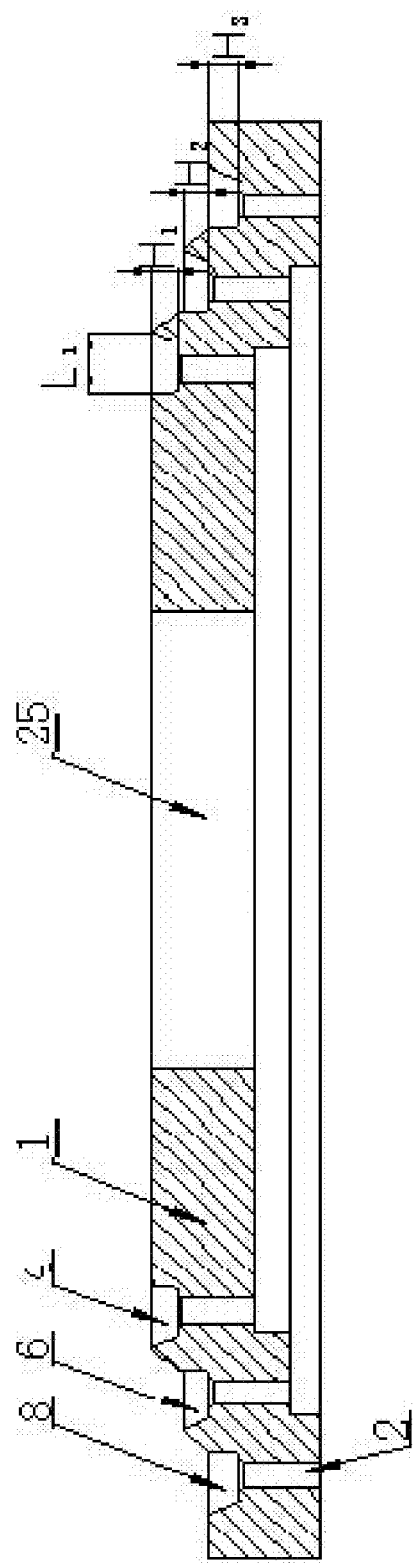
FIG. 3 is the structural representation of the circular ladder groove mold 1.
Figure 4:
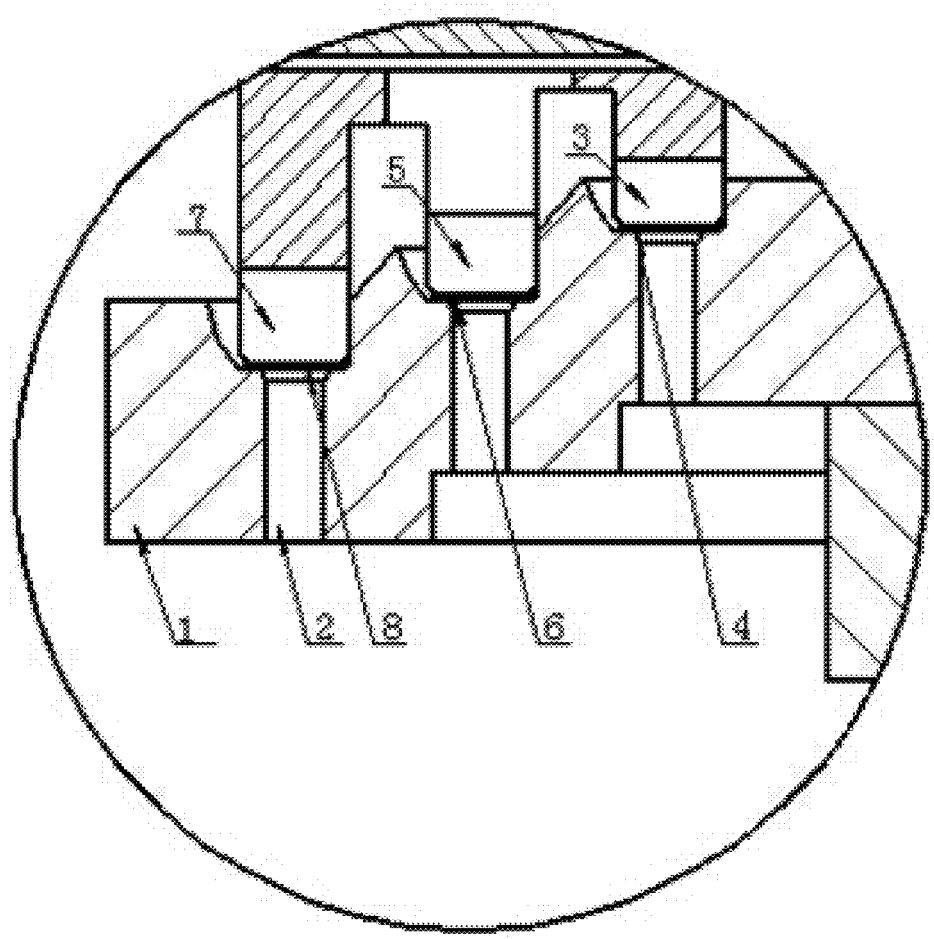
FIG. 4 is the enlarged structural representation of I part in FIG. 2.
Figure 5:
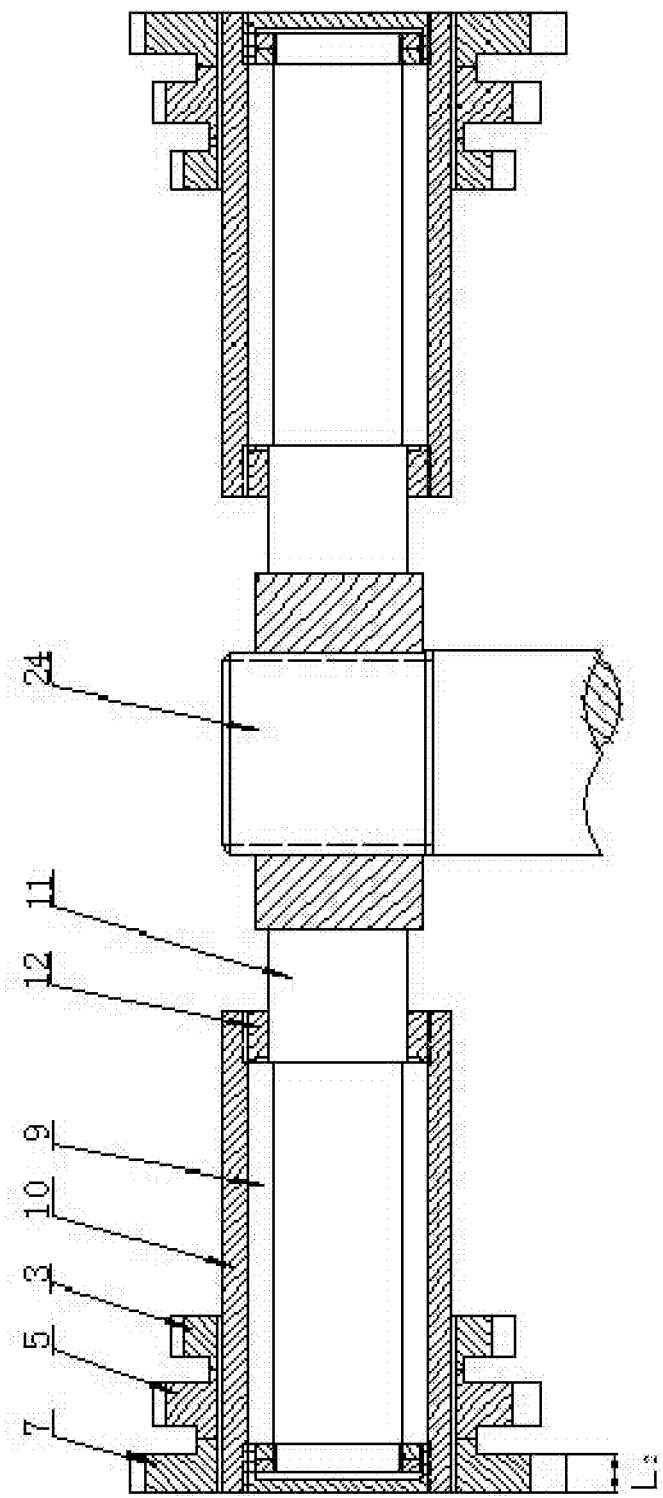
FIG. 5 is the structural representation of the circular ladder groove mold 1.
Figure 6:
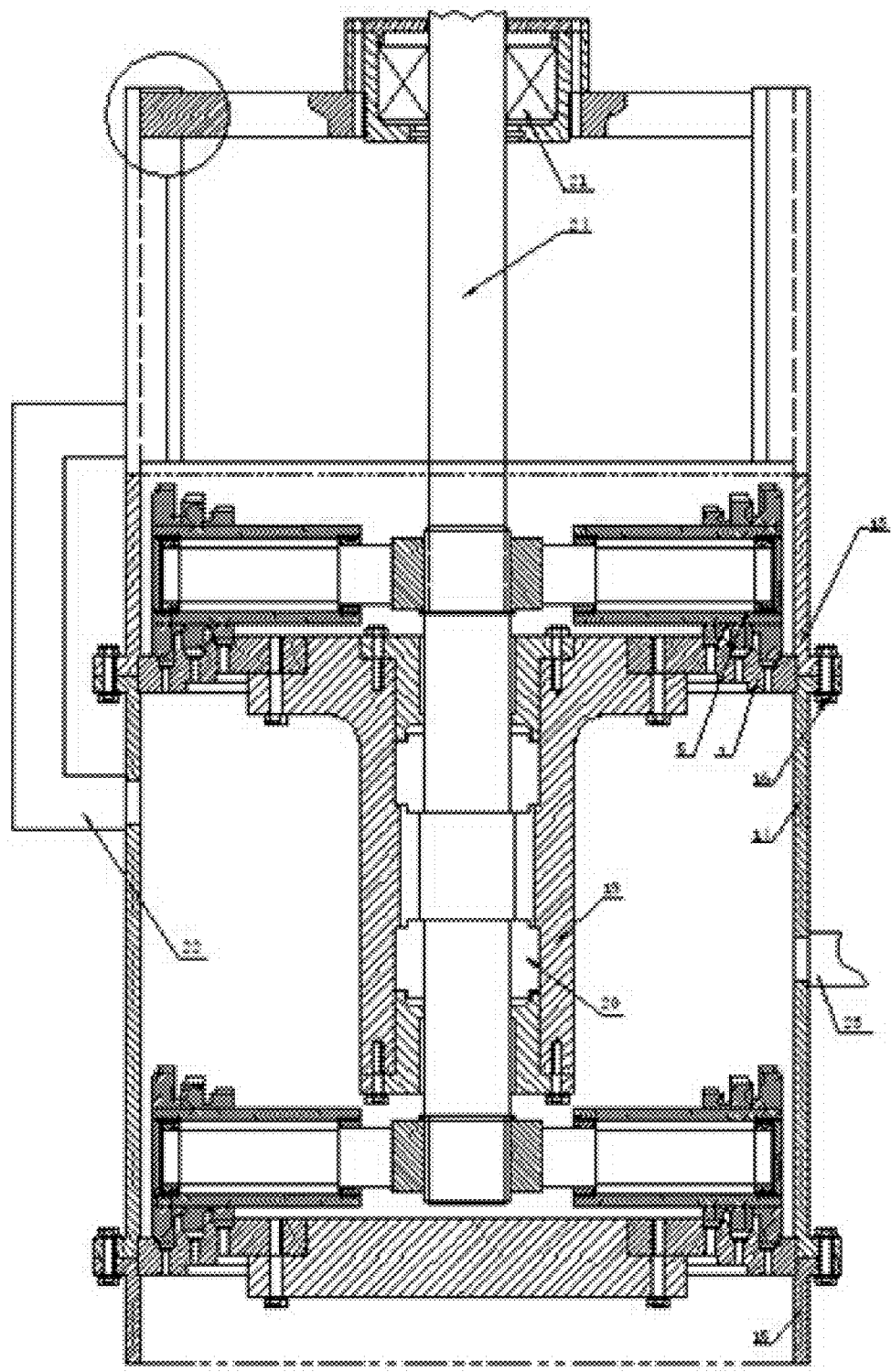
FIG. 6 is the structural representation of embodiment 1 of the tower type synchronous roller extruding machine used in the method of the present disclosure.

The present disclosure is further described below with reference to the attached drawings.

As illustrated in FIGS. 1-6, a device for preparing the fuel gas used for power generation of the present disclosure may include a furnace body 31, a tower type synchronous roller extruding machine with a circular ladder groove mold 1 is mounted at the upper end of the furnace body 31. The tower type synchronous roller extruding machine is provided with a bucket, the bucket is in airtight connection with the furnace body 31, a first transmission shaft 24 is mounted in the bucket, at least two tower type synchronous rollers are mounted on the first transmission shaft 24, and the tower type synchronous rollers are symmetrically distributed on both sides of the first transmission shaft 24; In the bucket, a circular ladder groove mold 1 is mounted at the lower part of the tower type synchronous roller, an annular groove is provided at the circular ladder groove mold 1, a die hole 2 is provided in the annular groove, a through hole 25 is provided in the middle part of the circular ladder groove mold 1, the upper end of the bucket is set as the feed inlet, the lower end of the bucket is used as the opening, the opening is located in the gas producer furnace, a grate 38 is installed at the lower part of the gas producer furnace body, and the grate 38 is connected with the second transmission shaft 33, A slagging pipe 58 is mounted one side at the bottom end of furnace body 31, an air inlet hole 32 is provided in the second transmission shaft 32, the air inlet hole 32 is communicated with a gas-mixing pipe 37, the gas-mixing pipe 37 is respectively connected with a vapor pipe 35 and an air pipe 36, a power transmission part 62 is mounted on the second transmission shaft 33, the power transmission part 62 is connected with the motor, the slagging pipe 58 is connected with a slagging tank 49, a spiral shaft 65 is mounted in the spiral slagging pipe, a furnace bottom ring 63 and a furnace bottom plate 41 are provided at the bottom of the gas producer furnace body; A second shaft sleeve (34) is mounted in the middle of the furnace bottom plate, a second transmission shaft (33) is mounted in the second shaft sleeve (34), a furnace bottom plate driving wheel (61) is mounted at the bottom of the second transmission shaft (33), an ash separation pan (42) is mounted at the middle-upper part of the second transmission shaft (33), an ash scraper pan (64) is mounted at the second shaft sleeve (34), the grate (38) is provided at the upper part of the ash scraper pan (64), the grate comprises multi-layer circular trays through connection, and the diameters of the circular trays gradually increase from top to bottom.

The preferred solution of the present disclosure: More than two annular grooves are preferably provided on the upper surface of the circular ladder groove mold 1, the depths of the annual grooves are distributed in ladder form according to the diameter differences between internal and external extruding trays, so that the depths match with the linear speed in the rotation of rolling trays; the inner wall on the outer edge of the annular groove is an arc-like incline plane, die holes 2 are provided in each of annular groove, the die holes 2 are evenly distributed within the 360° range of annular grooves, so that the material can evenly slide into the annual grooves without accumulation; The distribution of annular grooves in ladder form means that, when the annular grooves are distributed outwards from the central portion of the circular ladder groove mold 1, the diameters of the annual grooves gradually increase, and the surface of external edge on the upper end of the annual groove with large diameter is lower than the surface of external edge at the upper end of the annual groove with small diameter. In general, the ladder drop heights of annual grooves are even, the depths of annual groves vary with the increase in the diameters of annual rolling grays, so the annual groove at the outermost layer has the maximal depth.

The tower type synchronous roller of the present disclosure comprises multiple annual rolling trays with their diameters distributed in ladder form, the diameters of the annual rolling trays gradually increase outwards from the central portion of the bucket, and each annular rolling tray is coordinated with the corresponding annular groove. Every two annual grooves are connected with an inclined plane, the high end of the inclined plane is located at the external edge of the annular groove with small diameter, and the low end of the inclined plane is located at the internal edge in the annular groove with large diameter, and the external edge at the upper end of the annular groove with the minimum diameter is higher than the external edge at upper end of any annual groove. The depth of the annular groove at the outmost edge on the circular ladder groove mold 1 is greater than the depth of other annual grooves. This structure is characterized in that, the combination between the service life and the weight of device reaches a satisfactory value, so that the maintenance workload of roller is reduced to a lower level. The depth H1 of the first annular groove 4, the depth H2 of the second annular groove 6 and the depth H3 of the third annular groove 8 are within about 15-25 mm.

The further preferred solution of the preset disclosure is that, the first annular rolling tray 3 is mounted at the first shaft sleeve 10, the first shaft sleeve 10 is mounted on a rolling machine bearing 9, the rolling machine bearing 9 is mounted on one side of the supporting shaft 11, one end surface of the rolling machine bearing 9 is closely fitted to mount a graphite packing 12, the external end surface of the graphite packing 12 and the external end surface of the first shaft sleeve 10 are located in a same vertical plane.

The further preferred solution of the present disclosure: With the depth of the annular groove with the maximum diameter as the benchmark, the depths of the other annular grooves gradually decrease in turn towards the central portion of mold, so that when the linear speed reaches the optimum state, the production efficiency is greatly improved. Two edges at the internal bottom plane of the annular groove are designed as circular arc shape, the external edge at the end surface of the annual rolling tray is a fillet, the width L1 of the base plane of the annular groove is bigger than the end surface width L2 of the annual rolling tray by about 1-2 mm, the width of each annual groove is about 20-40 mm, the diameter of each die hole 2 is about 7-30 mm, the height of each die hole (2) is about 40-60 mm. With the coordination between the circular arc shape and the fillet, the end surface pressures of roller are even consistent, so that the discharging efficiency is further improved.

A method for using the device for preparing the fuel gas used for power generation to prepare fuel gas, comprising the following steps:

① Taking the mixture of crushed coal, coal or coal power and slag, the mixture of crushed coal and straw or the mixture of stack coal and straw as raw material, so that its water content reaches about 10-35%;

② Loading the raw materials obtained in step ① into the first machine set for repeated rolling and mixing, generating water-bearing heating-up mud body. In the process of passing through the die hole 2 of annual groove, the water-bearing heating-up mud body is lubricated by water content so that friction resistance is reduced and loose and high temperature particles are quickly extruded. The diameter of die hole 2 is about 20-30 mm;

③ Loading the loose high temperature cylindrical particles obtained in step ② in the second machine set for repeated rolling and mixing; through the die hole 2 of the annual groove, extruding the high-temperature sticky soft cylindrical particle materials with distilled tar. The diameter of die hole 2 is about 20-30 mm;

④ Loading the high-temperature, sticky cylindrical particle materials with distilled tar (water content is absorbed, and evenness is less than about 20%) which are obtained in step ③ into the third machine set for repeated rolling and mixing; through the die holes 2 of annular grooves, extruding the cylindrical particles, the diameter of die hole 2 is about 12-30 mm; the cylindrical particles which can still keep about 10-20% water content directly enter the gas producer furnace body and generate fuel gas after combustion; the first machine set, the second machine set and the third machine set have the same structure;

④ Loading the cylindrical particles obtained in step ③ in the third machine set for repeated rolling and mixing; through the die holes 2 of the annular grooves, extruding the cylindrical particle materials. The diameter of die hole 2 is about 12-30 mm; The cylindrical particles directly enter the gas producer furnace body and generate fuel gas after combustion;

The said first machine set, the second machine set and the third machine set have the same structure, wherein the first machine set has the following structure: Comprising a furnace body 31, a tower type synchronous roller extruding machine with a circular ladder groove mold 1 is mounted at the upper end of the furnace body 31, the tower type synchronous roller extruding machine is provided with a bucket, the bucket is closely connected with the furnace body 31, a first transmission shaft 24 is mounted in the bucket, at least two tower type synchronous rollers are mounted on the first transmission shaft 24, and the tower type synchronous rollers are symmetrically distributed on both sides of the first transmission shaft 24; In the bucket, a circular ladder groove mold 1 is mounted at the lower part of the tower type synchronous roller, an annular groove is provided at the circular ladder groove mold 1, a die hole 2 is provided in the annular groove, a through hole 25 is provided in the middle part of the circular ladder groove mold 1, the upper end of the bucket is set as the feed inlet, the lower end of the bucket is used as the opening, the opening is located in the gas producer furnace, a fire grate 38 is installed at the lower part of the gas producer furnace body, and the fire grate 38 is connected with the second transmission shaft 33, A slagging pipe 58 is mounted one side at the bottom end of furnace body 31, an air inlet hole 32 is provided in the second transmission shaft 32, the air inlet hole 32 is communicated with a gas-mixing pipe 37, the gas-mixing pipe 37 is respectively connected with a vapor pipe 35 and an air pipe 36, a power transmission part 62 is mounted on the second transmission shaft 33, the power transmission part 62 is connected with the motor, the slagging pipe 58 is connected with a slagging tank 49, a spiral shaft 65 is mounted in the spiral slagging pipe, a furnace bottom ring 63 and a furnace bottom plate 41 are provided at the bottom of the gas producer furnace body; A secondary shaft sleeve 34) is mounted in the middle of the furnace bottom plate, a second transmission shaft (33) is mounted in the second shaft sleeve (34), a furnace bottom plate driving wheel (61) is mounted at the bottom of the second transmission shaft (33), an ash separation pan (42) is mounted at the middle-upper part of the second transmission shaft (33), an ash scraper pan (64) is mounted at the second shaft sleeve (34), the grate (38) is provided at the upper part of the ash scraper pan (64), the grate comprises multi-layer circular trays through connection, and the diameters of the circular trays gradually increase from top to bottom. The said machine sets can be installed on different kinds of steel bed frames, and the extruded cylindrical particles are injected into furnace through transmission. The raw materials described in Step ① include inferior coal about 3000-5300 kal/kg used by fuel-burning power plant, coal burning boiler and coal-fired pit, more than 80% of crushed coal or stack coal which are remained after screening of lump coal. Since they contain more than about 20% of dirt and ash content, they cannot be burned off in furnace. Through the rolling and mixing by the tower type synchronous roller extruding machine of the present disclosure, the dirt band and dirt in the coal are damaged and rolled into coal dust mud, the coal dust mud and sludge are mutually and evenly packed, cylindrical particles are extruded and loaded into furnace, the coal dust is not blocked by dirt band and dirt in gasification reaction with oxygen, and coal dust particles can smoothly release gas in the conversion of fuel gas, so that the particles prepared by stack coal can substitute float coal and lump coal in gasification and can improve the coal gasification efficiency. The water content of stack coal and straw is 10-20%. In the extruding die holes of multiple sets in series connection, water plays the function of lubrication and anti-compaction. The water lubricatication function can multiply the output, and the machine set can extrude cylindrical particles with water content of about 10-20%, which are not compacted; in the preheating process in furnace, after volatilization of water content, the stack coal and straw contains gas, the tar can smoothly release honeycomb channel. This method can not only prevent the cylindrical particles from burst in the gasification, but also enable the particles to form cylindrical slag after gasification, so that the air flow layer discorded in gasification becomes stable.

The slag described in step ① can also be substituted by sludge. The raw material used in Step ① is mixture of stack coal, straw, lignite, oil shale or mixture of stack coal and slag or harmful sludge, the proportion of which are calculated as: stack coal, straw or stack coal about 60-70% and slag about 10-20%, water content about 10-35% or harmful sewage. Therefore, the harmful ingredients are subject to pyrolysis or recovered by purification system for other purpose. The slag is mixed to facilitate sufficient gasification; the water-bearing cylindrical particles have high output. The water content occupies certain space to prevent compaction; after volatilization of water content, smooth honeycomb is formed, which facilitate the smooth release of tar, without generation of burst.

For the raw materials described in step ①, it is also feasible to use oil shale or oil shale in combination with stack coal, straw and slag.

The raw materials in the method for preparation of fuel gas may include many combinations, such as the combination between crushed coal or stack coal, the combination of stack coal and slag, the combination of crushed coal and straw or the combination of stack coal and straw, or the combination of stack coal and lignite. The proportions of which are calculated by weight (%):

I. Stack coal 60-70, slag 10-20
  1. stack coal 60, slag 20
  2. stack coal 70, slag 10
  3. stack coal 65, slag 15

II. Stack coal 60-80, straw 10-30
  1. stack coal 60, straw 30
  2. stack coal 80, straw 10
  3. stack coal 70, straw 25
  4. stack coal 70, straw 30
  5. stack coal 80, straw 20
  6. stack coal 65, straw 25

III. Stack coal 50-70, lignite 20-40
  1. stack coal 50, lignite 40
  2. stack coal 70, lignite 20
  3. stack coal 60, lignite 40
  4. stack coal 60, lignite 30
  5. stack coal 55, lignite 35
  6. stack coal 70, lignite 25

IV. Crushed coal 50-70, stack coal 20-40
  1. crushed coal 50, stack coal 40
  2. crushed coal 70, stack coal 20
  3. crushed coal 60, stack coal 35
  4. crushed coal 65, stack coal 25
  5. crushed coal 55, stack coal 35
  6. crushed coal 70, stack coal 25

V. Crushed coal 60-80, straw 10-30
  1. crushed coal 60, straw 30
  2. crushed coal 80, straw 10
  3. crushed coal 70, straw 25
  4. crushed coal 70, straw 30
  5. crushed coal 80, straw 20
  6. crushed coal 65, straw 25

Without need for washing, dehydration and drying, the stack coal in the mixture of the stack coal and slag can be directly prepared as slurry through rolling, mixing and extruding, and proper quantity of slag is added. To deal with the harmful sludge, it is necessary to add same quantity of slag, so that the slurry is mutually packed with dirt band, dirt powder and pulverized slag and cylindrical fuel materials are extruded. In the combustion zone, coal has sufficient and drastic reaction with oxygen and steam and generate high temperature carbon dioxide, enter the reduction zone for reduction and neutralization, release carbon monoxide hydrogen; in the dry distillation zone, the coal dust smoothly releases hydrocarbon gas and tar gas.

The first machine set of the present disclosure also has the following structure: more than two annular grooves are provided on the upper surface of the circular ladder groove mold 1, the depths of the annual grooves are distributed in ladder form according to the diameter differences between the internal and the external extrusion trays; the inner wall on the outer edge of the annular groove is an arc-like incline plane, die holes are provided in each of annular groove, the die holes are evenly distributed within the 360° range of annular grooves; every two annual grooves are connected through an inclined plane, the high end of the inclined plane is located at the external edge of the annular groove with small diameter, and the low end of the inclined plane is located at the internal edge of the annular groove with large diameter, the external edge at the upper end of the annular groove with the minimum diameter is higher than the external edge at the upper end of any annular groove.

The tower type synchronous roller of the present disclosure comprises multiple annual tower type rolling trays formed by multiple grooves with linear speed diameters in coordination with extruding trays, with the diameter differences and the corresponding depths of grooves being distributed in ladder form. The diameters of the annual rolling trays gradually increase outwards from the central portion of the bucket. Each annual rolling tray is coordinated with the corresponding annular groove.

The tower type synchronous roller set of the present disclosure comprises a first annual rolling tray 3, a second rolling tray 5 and a third annual rolling tray 7, wherein these three annual rolling trays are mounted on the roller shaft sleeve 10; In the roller shaft sleeve 10, 3 or 4 rows of rolling machine bearings 9 with thickness bigger than about 170 mm are mounted, the rolling machine bearings 9 are fixed on the supporting shaft 11, the graphite packing 12 is firmly fixed on the rolling machine bearings 9 and plays the function of temperature resistance and sealing. The rolling machine bearing 9 with thickness bigger than about 170 mm have the advantages as long duration, high temperature resistance and high-intensity loading capacity. When coal dust enters the rolling wheel after malfunction of graphite, the rolling machine bearing 9 can still perform normal operation. When the annual grooves of tower type synchronous roller set have diameters within about 1000-1200 mm, it is necessary to provide 4~8 tower type synchronous rollers. When there are 6~8 tower type synchronous roller, it is feasible to reduce the blockage of materials rolled by tower type synchronous roller, reduce the resistance on the rolling of tower type and prevent the tower type synchronous roller from slipping and thus being unable to perform normal operation.

The tower type synchronous roller extruding machine described in step ② may be used in multilayer series connection. The circular ladder groove mold 1 at upper layer is mounted at the joint between the first bucket 13 and the second bucket 14, the first bucket 13 and the second bucket are fasten through flanged shaft and bolt 16, the circular ladder groove mold 1 at lower layer is mounted at the joint between the second bucket 14 and the third bucket 5, and the second bucket 14 and the third bucket 5 are fasten through flange and bolt. The supporting seat 19 and the carrier bearing 20 are connected in series with the upper and the lower tower type synchronous rollers through the main shaft; In case of high load operation, a guide bearing 21 provided at the top of the first transmission shaft 24 increases high-intensity additional pressure on the tower type synchronous roller. Once any annular rolling tray or groove has abrasion, the first transmission shaft 24 slides downwards to make compensation, so as to ensure that the granulation machine has the life for rolling, mixing and extruding more than about 10,000 tons of cylindrical particles. The method of fixing the bottom of the third bucket 15: A, the bottom end of the third bucket 15 is mounted at the upper end of the stack coal particle gasification furnace, the stack coal cylindrical particles or straw cylindrical particles prepared through rolling, mixing and extruding directly fall into the furnace; integrating the function of charging and closing, at the same time, using the temperature in furnace to heat the space of the third bucket 15, the tower type synchronous roller, the circular ladder grove mold 1 and the second bucket 14. The bottom ends of the third bucket 15 are mounted on different kinds of iron beds and iron frames. The cylindrical particles prepared through rolling, mixing and extruding fall into different kinds of transfer devices and then discharged; In using A and B fixing methods, whether the driving device is provided at upper part or lower part is determined according to field conditions. Multiple groove annual dies are arranged from inside to outside on the circular ladder groove mold 1. Each annual rolling tray matches each groove according to the annular perimeter and die hole, and annular rolling trays can realize synchronous rotation.

Stack coal and slag stone powder are added as one of the raw materials. Through rolling, mixing and extruding, the prepared stack coal cylindrical particles have good molding, without generation of crushed coal dust. Since they contain water content and have no appearance of dust, the extruded stack coal cylindrical particles have the following characteristics: water-bearing, muddy, not liable for breakage, no generation of generation, being able to substitute the intensity of lump coal through soft and flexible nature. Since fine coal power of cylindrical particles contain water content, after evaporation of water, the left space structure becomes soft honeycomb, which is liable to gasification, like lignite and coal dust coking; the generated methane reaches about 10%, so that the heat value of coal gas is improved to about 10500 KJ/m$^3$.

The gas producer furnace described in step ③ of the present disclosure comprises two part structures: One part is the tower type synchronous roller extruding machine mounted at the top end of gas producer furnace, it is designed to process the mixture of stack coal and slag, the mixture of crushed coal and straw, or the mixture of stack coal and straw or the mixture of stack coal and crushed coal into fuel material of cylindrical particles; the cylindrical particles directly fall into the furnace for combustion; the fuel materials of cylindrical particles are distilled in furnace at high-temperature state of about 400° C.-1300° C. In the fuel materials, the straw with low ignition point volatilizes and releases hydrogen and methane, thus increasing the heating value of fuel gas; so the tar is always in gasified state without coking and without need for secondary pressurization; the generated fuel gas can directly enter the gas turbine. The another part comprises the gas producer furnace body as well as the drive component which is mounted at the outside of furnace body bottom and drives the grate 38 to rotate, the air inlet mixing pipe and the slagging structure. The drive components include a motor. The motor drives the gear to rotate through gearbox and in turn drives the grate 38 to rotate through the second transmission shaft 33 so that the furnace dust is smoothly discharged into the ash tank 49 through the slagging pipe. The slagging pipe 58 is connected with the ash tank 49, and a spiral shaft 65 is mounted in the slagging pipe 58. This structure facilitates the timely discharging of ash and enable the fuel materials in the furnace to maintain normal combustion and keep constant temperature.

The first transmission shaft 24 on the tower type synchronous roller extruding machine described in the step ② of the present disclosure can also respectively realize rotary transmission of power to more than two tower type synchronous rollers through the gearbox. In this transmission structure, in the process of rotation, the first transmission shaft 24 transmits power to the roller shaft, the roller shaft then drives the tower synchronous roller to rotate, so as to maintain the stability of power transmission as well as the uniformity of rolling and extruding raw materials, and thus the fuel materials further keep higher hardness. Extruding slots are evenly distributed on the external surface of the tower type synchronous rollers, to that the contact area for extruding raw materials is increased, and thus evenness of mixing is further improved.

When the tower type synchronous roller extruding machine described in step ② of the present disclosure is directly mounted on the upper end of the gas producer furnace for use, under this state, the tower type synchronous rollers are mounted at the lower end of the first transmission shaft 24, the lower part of the third bucket 15 is connected with the furnace body 31, the tower type synchronous rollers are located in the furnace body 31 to facilitate the fuel materials to evenly and continuously fall into the hearth for combustion. The spontaneous combustion zone formed by the fuel materials which fall into the gas producer furnace is mainly divided into four layers. The bottom layer is the explosion protection ash in thickness of about 0.3-1.2 m, which is used for protection of grate 38; Combustion layer in thickness of about 0.9-1.2 m is positioned at the upper surface of ash layer; the fuel material reduction layer is positioned at the upper surface of combustion layer, this layer is used to reduce the carbon dioxide generated at the combustion layer (with temperature of more than 1000 degree) to carbon monoxide; After vapor has contacted high temperature carbon, vapor is absorbed and generates hydrogen, carbon monoxide and methane through catalytic decomposition, and also keeps the temperature in furnace as 400-900° C.; Dry distillation layer in thickness of 1.2-3 meter is positioned on the reduction layer, and it is used to make evaporation of water for the 600-900° C. thermal current transmitted from reduction layer, so as to turn the raw materials into smooth honeycomb cylindrical particles for dry distillation. Through dry distillation, the tar and hydrocarbon gas have been evaporated along water content, channel is released. After entering the preliminary heating layer, the temperature of thermal current drops to 300-600° C., the thermal current gradually heats up the cylindrical particles of stack coal, so that water content is quickly evaporated form the cylindrical particles, and honeycomb of space is left after evaporation of water in the cylindrical particles of stack coal. These fuel layers can help generate more methane and hydrogen in the fuel gas, reduce the generation of carbon monoxide and surplus oxygen, so that the fuel gas can reach various indicators of the present disclosure.

The gas producer furnace of the present disclosure is designed with a structure for timely discharge of ash. When the gas producer furnace is operating under general working capacity, the gas producer furnace generally consumes more than 10 tons of fuel materials per hour. If ash and residue cannot be discharged in time, the quality and quantity of fuel gas generated in the furnace will be directly affected. Therefore, a furnace bottom ring 63 and a furnace bottom plate 41 are provided at the bottom of the gas producer furnace body. A shaft sleeve 34 is mounted in the middle of the furnace bottom plate 41, a second transmission shaft 33 is mounted in the shaft sleeve 34, the second transmission shaft 33 is connected with the ash scraper pan 44 and ash separation pan 42, the grate 38 is positioned at the upper part of the ash scraper pan 39 through the driving gear 62 and the driven gear 61, the power drives the second transmission shaft 33 to rotate, and in turn drives the grate 38, the ash scraper pan 64 and the ash separation pan 44 to rotate. In the process of rotation, the ash scraper pan 39 scraps slag in the ash separation pan 42, and slag falls on the furnace bottom tray 41 through the first missing hole 56. In addition, the ash scraper pan 64 scraps the slag into the second missing hole 57 of the furnace bottom tray 41, and finally enters the spiral shaft 65 through the deliver pipe 58, so as to discharge ash into the ash tank 49. Water is put in the ash tank 49 through water pipe 53 and is mixed with ash, and the mixture is stirred by the spiral stirring wheel 48 into mortar, a base plate 47 is mounted at the bottom of the ash tank 49, a third rotor shaft 44 is mounted on the base plate 47, the third rotor shaft 44 is connected on the stirring wheel 48, the centrifugal impeller 43 is mounted on the third rotor shaft 44, when the centrifugal impeller 43 is rotating quickly, it press mortar into the outlet 45 and inputs the motor into separation tank through a motor delivery pipe 46. The overall system for discharging ash is featured by stable structural performance, long service life and high safety and reliability.

The eccentricity between the center line of the second transmission shaft 33 of the gas producer furnace and the center line of the grate 38 is about 100-200 mm so that the mixed gas which has entered the grate 38 can quickly scatter and pass through the ash layer 66 in thickness of about 0.3-1.2 m. The quantity of fuel gas generated by the gas producer furnace depends on such working parameters as the operating pressure in the furnace and the introduced gas (oxygen or air). For example, if the diameter of gas producer furnace is about 3.8 m the operating pressure in furnace is 12-30 kg/cm$^2$ when the introduced oxygen pressure is about 12-15 kg/cm$^2$, and the output fuel gas quantity is about 1200-3000 m$^3$/m$^2$h; when the introduced oxygen pressure is about 25-30 kg/cm$^2$, the output quantity of fuel gas is about 3000-5000 m$^3$/m$^2$h; when the introduced air pressure is about 8-10 kg/cm$^2$, the output fuel gas quantity is about 400-700 m$^3$/m$^2$h.

At the dry distillation layer with temperature of about 600-900° C. in furnace, in the fuel materials used in the method of the present disclosure, the hydrocarbon gas and tar with lower ignition point firstly form gas and release hydrogen, methane and tar gas, so as to increase the heating value in the fuel gas, so as to achieve the purpose of driving gas turbine.

The fuel materials of cylindrical particles described in the present disclosure generally have diameter of about 12-30 mm and length of about 30-200 mm. For the tower type synchronous roller extruding machine mounted at the upper end of the gas producer furnace, when it is necessary to avoid using one circular ladder groove mold 1, the high pressure fuel gas in the furnace punches trough one through hole on the circular groove mold 1 to generate gas leakage, and multiple groups of tower type synchronous rollers and circular ladder groove molds 1 are connected in series on the first transmission shaft 24. Multiple groups of tower type synchronous rollers and circular ladder groove molds 1 have the identical structure. It is also feasible to increase the molding quality of fuel material to facilitate the formation of slag, so that the fuel gas has better penetrability and even facilitate gasification. The tower type synchronous rollers of the present disclosure generally have diameter of about 200-600 mm, power of about 50-1000 KW and yield rate of about 10-30 t/h.

Figure 7:
FIGS. 7 and 8 show the real object of cylindrical particles.
Figure 8:
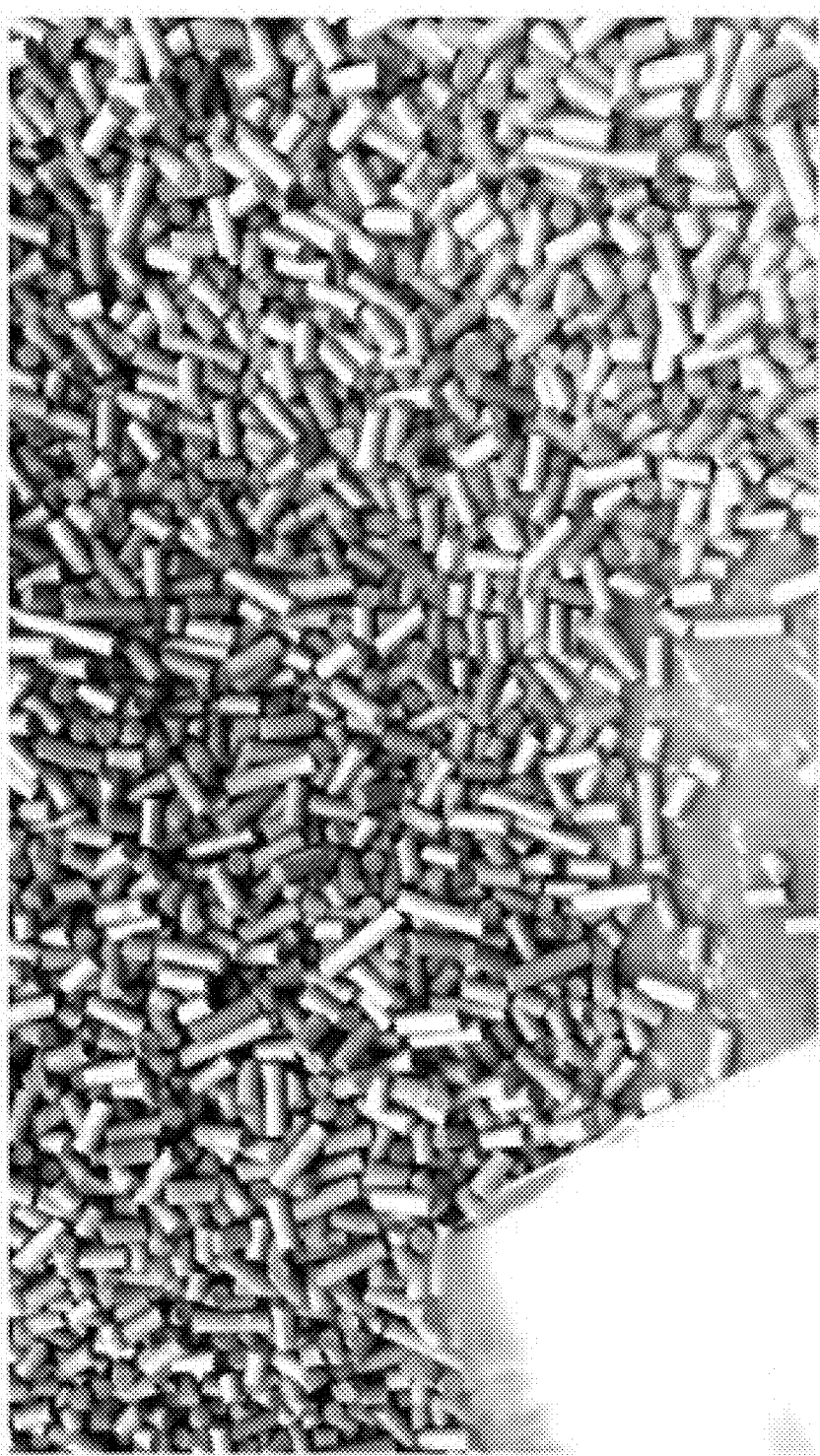
Figure 9:
FIGS. 9 and 10 show the real object of the slag generated after combustion of cylindrical particles.
Figure 10:
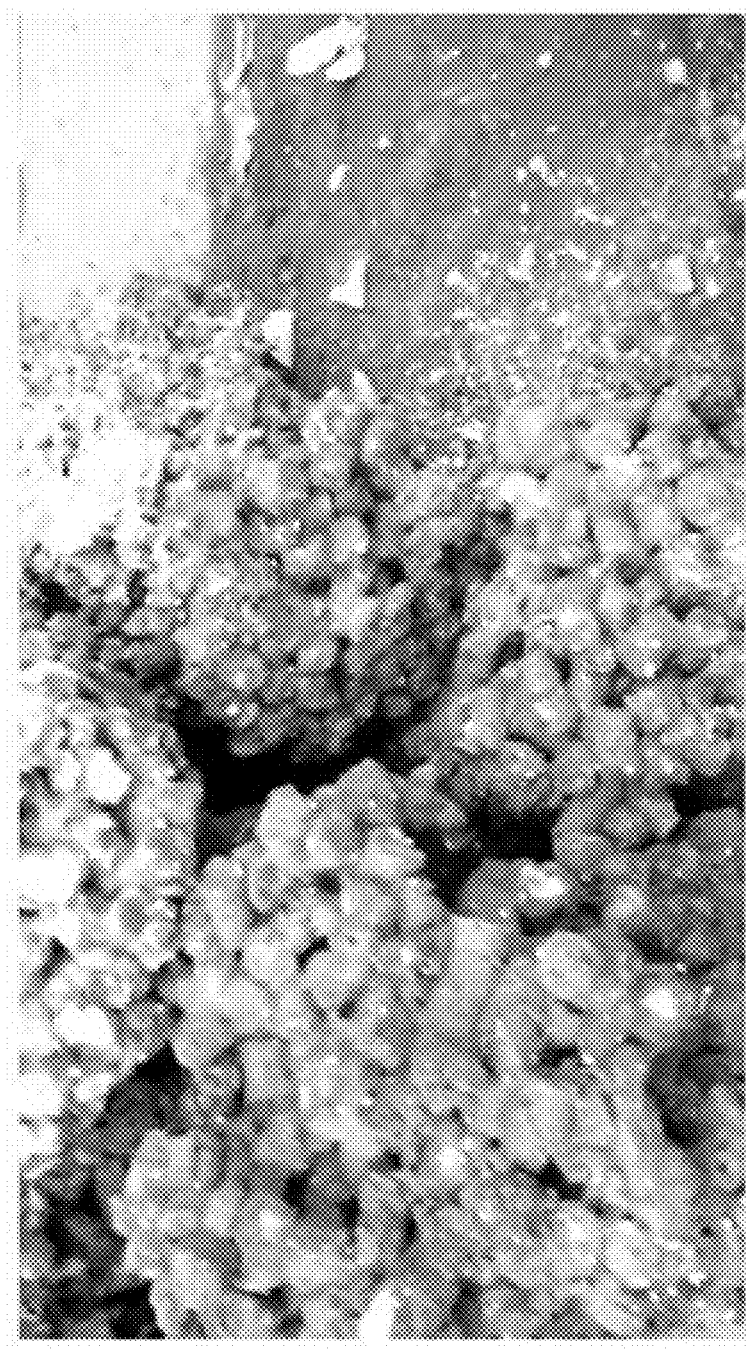

In the preparation method of the present disclosure, it is preferred that, three tower type synchronous roller extruding machines are connected in series for operation: The first tower type synchronous roller extruding machine is used for rolling, kneading and removing excessive water content, and extruding slurry with temperature higher than about 100° C. through die hole 2 with diameter of about 30 mm; the second tower type synchronous roller extruding machine is used for rolling and kneading the hot coal slurry extruded from the first tower type synchronous roller extruding machine, and extruding cylindrical particles with temperature higher than about 200° C. and diameter of about 30 mm, which are basically molded, through die hole 2 with diameter of about 30 mm; the third tower type synchronous roller extruding machine is used for rolling and kneading the cylindrical particles extruded from the second tower type synchronous roller extruding machine, and extruding cylindrical particles through die hole 2 with diameter of about 15-18 mm, the cylindrical particles are directly used as fuel material for combustion. According to the optimal solution, the third machine set is mounted at the top of gasification furnace, the extruded cylindrical particles directly fall into the furnace, so that the charring and sealing functions are integrated. The operating pressure withstood in the furnace is about 0.07-0.2 MPa. For the outstanding characteristics of the cylindrical particles with diameter of about 15-18 mm, see the real objects as shown in FIGS. 7 and 8. The diameter of about 15-18 mm is preferred diameter. After gasification, the residual slag can form and keep the honeycomb formed by cylindrical particles, as shown in FIGS. 9 and 10. The cylindrical particles described in the present disclosure have long, thin and uniform shape, and the gasification effect is effectively improved. What is more important, the carbon dioxide reduction rate is high, the carbon dioxide content is reduced, the content of carbon monoxide and hydrogen can reach about 75%, and more than about 10% methane can be generated at the same time. The electricity coal used by thermal power station can also be prepared by using the technology of the present disclosure. For example, add about 10-35% of water content in electricity coal, through rolling and kneading, prepare extra fine coal dust slurry, then extrude cylindrical particles, load the cylindrical particles into gas producer furnace to generate sharp reaction with oxygen and steam, generate nitrogen-free coal fuel gas; after recovery of tar, benzene, phenol and sculpture in the pipeline transmission at furnace port, generate clean power coal fuel gas.

The cylindrical particles of stack coal generally have diameters of about 30 mm, 25 mm, 20 mm, 18 mm, 16 mm and 12 mm. After the diameter of cylindrical particles are regulated according to coal quality and gasification is realized, the carbon content of slag is zero, so that the coal dust is gasified to the maximum extent and clean fuel gas is output. The cylindrical particles of stack coal can have sharp reaction with pure oxygen, overcome the deficiency of solid lump coal and change the case that about 79% nitrogen in the air may loss heat energy by more than about 15% in the carbon reaction process. The coal fuel gas prepared in the method of the present disclosure has not mixed nitrogen, so that the efficiency of gas turbine and gas internal-combustion engine is improved by about 15%. The heat value conversion efficiency between the cylindrical particles of fuel material synthesized by extra fine coal dust and the gasification agent: the heat value generated by gasification with oxygen and steam has exceed about 28 KJ/g, and efficiency has exceeded about 90%; the efficiency of heat value about 21 KJ/g generated by gasification with enriched oxygen and steam reaches about 70%; the heat value generated by gasification with air and steam is about 18 KJ/g, with efficiency up to about 50%. For the results of analysis and chemical tests (115 chemical tests on the field in continuous 21 days), see FIGS. 11 and 12; the use of oxygen and steam is the key to significantly improve the thermal efficiency, which is nearly doubled as compared with the energy efficiency of gasification with air and steam.

The nitrogen-free coal fuel gas generated by loading the cylindrical particles of stack coal into gasification furnace can substitute natural gas and used in the combined cycle generation of gas turbine-steam turbine. Its significant effect in environmental protection depends on:

1. At the dry distillation layer with temperature of about 600-900° C. in furnace, each extra fine coal dust particle releases tat, benzene, phenol and sculpture gases without hindrance, these gases along with air current are purified and recovered in the low temperature pipeline and become useful chemical raw materials. This method can avoid these harmful elements from entering the high temperature up to about 1000 C, being combusted and discharged to atmosphere, so as to solve the problem that the harmful elements in coal are burned at high temperature and become noxious gases.

2. In the gasification process, it is feasible to realize the sharp reaction between high quality coal and steam (1:1 proportion by weight) with oxygen; the steam is neutralized with the high temperature carbon and release $H_2$, CO and $CH_4$, so that $H_2$ content in fuel gas reaches about 35%, and heat value reaches about 9800 kJ/m$^3$. When these elements smoothly enter the gas turbine to do work, 50% CO2 discharge can be directly reduced as compared with coal-fired power generation.

3. The reaction process between extra fine coal dust and oxygen/steam: the effective ingredients in $H_2$, CO, $CH_4$ fuel gas can reach more than about 75%; enter gas turbine-discharge about 500° C. fume-exhaust-heat boiler-steam turbine power generation only consumes about 55% of equivalent coal consumption in coal-fired boiler steam power generation, namely about 45% coal can be saved, and emission of CO2 lower than about 50% is reduced in equivalent power generation capacity.

4. Ash content can reach about 35% stack coal, or added with about 10-20% slag, harmful sewage and sludge; satisfactory gasification can be realized, so as to solve the slow oxidation of low-value coal in open air and contamination; harmful sludge and sewage are smoothly treated at low value. In addition, in the whole preparation process, keep the water content of stack coal as about 10-35%; the raw materials are loaded in furnace, and production process is in sealed condition, without generation of coal dust, mill dust and sewage.

5. Because oxygen is used as gasification agent and no nitrogen is included, low-cost technology and process are used to separate pure $CO_2$ from fuel gas for comprehensive utilization; the surplus gases can be discharged to methanol, oil field, shale bed and coal mine goal; perform underground injection of pure $CO_2$, mainly input $CO_2$ towards methanol, forest and vinyl house: first, no longer use pesticide for disinfestation, second; improve output; three, guarantee green product.

6. The maximal environmental protection effect: supply the output nitrogen-free coal fuel gas to various coal firing and straw-firing corners; from the perspective of environmental protection, it is feasible to prohibit direct firing of coal and eliminate the root cause of atmosphere pollution.

In the attached figures, 22 represents pipeline, 23 represents pipeline, 50 represents power input shaft, 52 represents strengthening rib, 54 represents fuel gas outlet, 55 represents water jacket and 67 represents gearbox.

What is claimed is:

1. A device for preparing fuel gas used, comprising:
    a furnace body;
    a tower type synchronous roller extruding machine with a circular ladder groove mold, wherein the tower type synchronous roller extruding machine is mounted at a upper end of the furnace body and is provided with a bucket, the bucket is in airtight connection with the furnace body;
    a first transmission shaft that is mounted in the bucket, wherein at least two tower type synchronous rollers are mounted on the first transmission shaft, and the tower type synchronous rollers are symmetrically distributed on both sides of the first transmission shaft;
    a circular ladder groove mold mounted in the bucket at a lower part of the tower type synchronous roller;
    an annular groove provided at the circular ladder groove mold;
    a die hole provided in the annular groove;
    a through hole provided in a middle part of the circular ladder groove mold, wherein a upper end of the bucket is set as a feed inlet, a lower end of the bucket is used as an opening located in a gas producer furnace;
    a grate installed at the lower part of a gas producer furnace body, wherein the grate is connected with a second transmission shaft;

a slagging pipe mounted one side at a bottom end of furnace body;

an air inlet hole provided in the second transmission shaft, wherein the air inlet hole is communicated with a gas-mixing pipe that is respectively connected with a vapor pipe and an air pipe;

a power transmission part mounted on the second transmission shaft, wherein the power transmission part is connected with a motor;

a slagging pipe connected with a slagging tank;

a spiral shaft mounted in the spiral slagging pipe;

a furnace bottom ring and a furnace bottom plate that are provided at the bottom of the gas producer furnace body;

a second shaft sleeve mounted in the middle of the furnace bottom plate;

a second transmission shaft mounted in the second shaft sleeve;

a furnace bottom plate driving wheel mounted at the bottom of the second transmission shaft;

an ash separation pan mounted at a middle-upper part of the second transmission shaft; and an ash scraper pan mounted at the second shaft sleeve, wherein the grate is provided at a upper part of the ash scraper pan, the grate comprises multi-layer circular trays through connection, and diameters of the circular trays gradually increase from top to bottom.

2. The device of claim 1, wherein more than two annular grooves are provided on a upper surface of the circular ladder groove mold, the annular grooves are distributed in ladder form, an inner wall on an outer edge of the annular groove is an arc-like incline plane, die holes are provided in each of annular groove, and the die holes are evenly distributed within 360° range of annular grooves.

3. The device of claim 1, wherein the tower type synchronous comprises multiple annular rolling trays with their diameters distributed in ladder form, the diameters of the annular rolling trays gradually increase outwards from a central portion of the bucket, and an individual annual rolling tray of multiple annular rolling trays is coordinated with a corresponding annular groove.

4. The device claim 2, wherein every two annual grooves are connected through inclined plane, a high end of the inclined plane is located at an external edge of the annular groove with small diameter, the low end of the inclined plane is located at an internal edge of the annular groove with large diameter, and the external edge at the upper end of the annular groove with a minimum diameter is higher than the external edge at a upper end of any annular groove.

5. The device of claim 2, wherein a first annular rolling tray is mounted at a first shaft sleeve, a first shaft sleeve is mounted on a rolling machine bearing, the rolling machine bearing is mounted on one side of a supporting shaft, one end surface of the rolling machine bearing is closely fitted to mount a graphite packing, an external end surface of the graphite packing and the external end surface of the first shaft sleeve are located in a same vertical plane.

6. The device of claim 3, wherein two edges at an internal bottom plane of the annular groove are designed as circular arc shape, an external edge at an end surface of the annual rolling tray is a fillet, a width L1 of a base plane of the annular groove is from about 1 to 2 millimeters (mm) wider an end surface width L2 of the annual rolling tray, the width of each annual groove is from about 20 to 40 mm, the diameter of each die hole is from about 7 to 30 mm, a height of each die hole from about 40 mm to 60 mm.

* * * * *